April 17, 1934.   B. A. MUELLER   1,954,942
COMBINED RADIATOR VALVE AND HUMIDIFIER
Filed Dec. 22, 1931
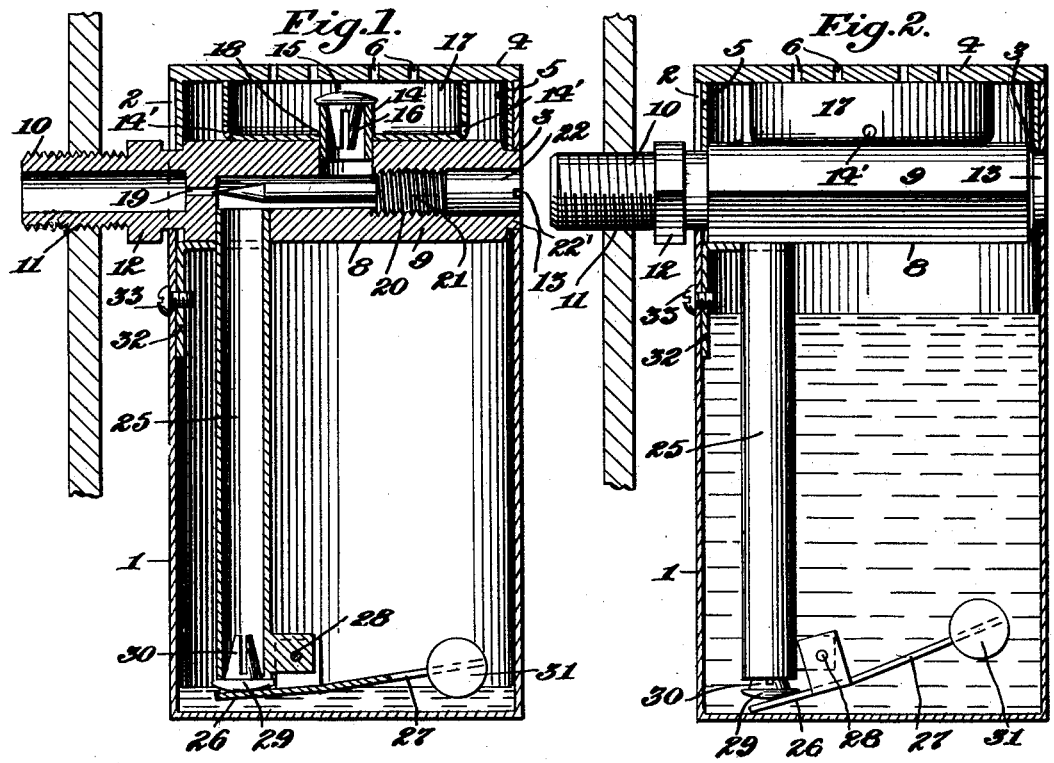
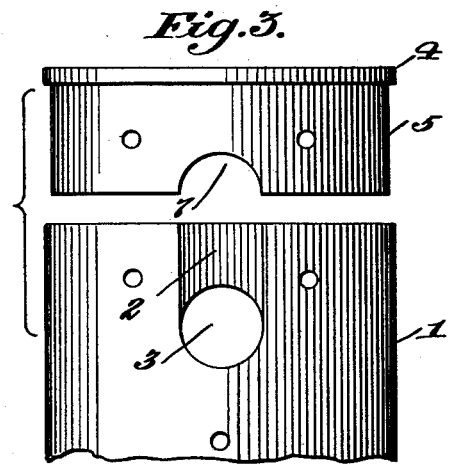
Inventor:
Bernhard A. Mueller,
Att'y.

Patented Apr. 17, 1934

1,954,942

UNITED STATES PATENT OFFICE 1,954,942

COMBINED RADIATOR VALVE AND HUMIDIFIER

Bernhard A. Mueller, East St. Louis, Ill.

Application December 22, 1931, Serial No. 582,619

5 Claims. (Cl. 237—78)

My invention relates to combined air valves and humidifiers for radiators.

My invention consists of an improved air valve and humidifier of simple construction and of low cost to manufacture, and will be hereinafter described and particularly pointed out in the claims.

In the drawing:

Figure 1 is a vertical sectional view of the device.

Figure 2 is a side elevation with the container broken away showing the float valve in raised position.

Figure 3 is an enlarged view of the upper end of the container with its cover removed.

The container 1 is shown as an open cylinder provided at its upper edge with an open slot 2 and directly opposite thereto with an aperture 3. The upper open end of the container 1 is provided with a cover 4 having a flange 5 closely fitting the upper open end of the container. The cover 4 is provided with perforations 6 for the escape of steam or moistened air. The flange 5 is provided at its lower edge with open slots 7 registering with the slot 2 and aperture 3 respectively. The valve 8 controls the admission of steam into the container 1 and comprises a casing 9 provided at one end with a threaded nipple 10 to screw into the radiator opening 11 and having a nut 12 to receive a wrench. The nipple 10 back of this nut 12 fits into the slot 2, while the opposite reduced end 13 is received in an aperture 3, the horizontal valve casing thus riding at one end in slot 2 with its other end in aperture 3 is held down by the open slits 7 of the cover. The valve casing 9 is provided on its upper side between its ends with a short tube 14 having its upper end adapted to serve as a seat for an upwardly opening valve disc 15 having a depending guide 16 which keeps it in position in tube 14. Over the valve is mounted a cup shaped steam chamber 17 provided with a central aperture 18 fitting over the tube 14 and provided with apertures 14¹ to allow condensate to pass down into the container 1. The horizontal area of chamber 17 is such as to include within it the cover apertures 6 and directs the steam or moist air through said apertures into the room.

The valve casing 9 is bored longitudinally and has a reduced end opening 19 leading to the nipple 10 and the other end of the casing 9 is threaded as at 20 to receive the threaded end 21 of a needle valve 22 having a nick 22¹ in its outer exposed end to receive the end of a screw driver for adjusting it. The opposite end of the needle valve 22 controls the opening 19.

A drain pipe 25 extends down from the valve casing 9 to the lower end of the container 1 and is provided at its lower end with a hinged float valve 26. The float valve comprises a vertically swinging arm 27 pivoted at 28 to the lower end of the drain pipe 25 and is provided at its shorter end with a valve 29 having a guide stem 30 entering the lower open end of the drain pipe. The longer end of the arm 27 has a float 31 mounted thereon. When steam from the radiator enters through nipple 10 and opening 19 into the interior of valve casing 9, it will pass upward through tube 14, lifting valve 15, into steam chamber 17 and will escape through openings 6 into the room. Any water from condensation of steam in chamber 17 will drip through opening 14¹ and fall into the portion of container 1 below the valve casing.

When steam is cut off from the radiator the pressure within it drops and, if it falls below atmospheric pressure, there will be a partial vacuum within the radiator and suction through opening 19 instead of outflow. The container being so far filled with water of condensation as to lift float 31 and to keep valve 29 away from its seat at the lower end of drain tube 25, the inward suction through opening 19, will draw in water from pipe 25 until the level of the water in the container is so lowered as to permit float 31 to drop far enough to permit valve 29 to seat itself, cutting off further inward flow. When steam is again admitted into the radiator there will be an outflow of steam through opening 19 and condensed water will again accumulate in the container.

A bracket 32 secured by screw 33 to the container 1 is to hold the valve casing 9 from dropping down when the humidifier is being attached to a radiator.

Various changes may be made in my construction without departing from the spirit of my invention.

What I claim is:

1. A combined radiator vent valve and humidifier comprising a container adapted to contain condensate and provided with apertures for escape of vapor, a valve casing having a needle valve therein extending through the container and provided with means for securing it to a radiator, said valve casing having a valve controlled steam outlet, a drain pipe extending down from the valve casing into the container, a valve for the lower end of the drain pipe and means for controlling said valve by the rise and fall of the level of the condensate in the container.

2. A combined radiator vent valve and humidifier comprising a closed container provided with escape apertures for vapor and adapted to contain condensate, a transverse valve mechanism supported in the upper end of the container and provided at one end with means for connecting it with a radiator, a valved steam outlet between the ends of the valve casing below the escape apertures of the container, a drain pipe extending down from the valve casing, a valve for the lower end of the drain pipe and means controlled by the rise and fall of the level of the condensate in the said container for opening and closing the valve opening.

3. A combined radiator vent valve and humidifier comprising a closed container having escape apertures in its upper end, a transverse valve casing having an attaching nipple at one end for connection with a radiator, a needle valve extending longitudinally through the valve casing, a valved steam outlet between the ends of the valve casing, a condensation cup at the said steam outlet having an opening therefrom into the container, a drain pipe leading down from the valve casing into the lower end portion of the container and an automatic valve for the lower end of the drain pipe controlled by the rise and fall of the level of the condensate in the container.

4. A combined radiator vent valve and humidifier comprising a closed container provided with escape apertures for vapor, a transvere valve casing supported at its ends in opposite sides of the container and having at one exposed end a threaded nipple for attachment to a radiator, a needle valve within the valve casing controlling the entrance of steam and air through the nipple into the valve casing and means exposed for operation through the opposite side of the container for controlling the needle valve, a valved outlet tube between the ends of the valve casing, a drain tube leading down from the valve casing having a valve at its lower end, and means actuated by the rise and fall of level in the condensate in the container for opening and closing the valve opening.

5. A combined radiator vent valve and humidifier comprising a container having an open slot and an opposed aperture in its upper edge, a horizontal valve casing supported at its ends in the said slot and opening respectively, having at one end a nipple for connecting the device to a radiator, a valve in the valve casing near the nipple end, means for operating the valve extending through the other end of the valve casing, an apertured cover for the container, a valved steam outlet extending up from the said valve casing, a condensate cup surrounding the said steam outlet and having a discharge opening leading into the container, a drain pipe extending down into the container from the valve casing and provided at its lower end with an automatic valve controlled by the rise and fall of the level of the condensate in the container.

BERNHARD A. MUELLER.